(12) United States Patent  (10) Patent No.: US 8,347,585 B2
Meisel et al.  (45) Date of Patent: Jan. 8, 2013

(54) MODULAR SEISMICALLY RESTRAINED DISTRIBUTION SYSTEM AND METHOD OF INSTALLING THE SAME

(75) Inventors: Paul Meisel, Dublin, OH (US); Richard Sherren, Pataskala, OH (US); Gregory Hively, Grove City, OH (US); Angela Waters, Grove City, OH (US)

(73) Assignee: Kinetics Noise Control, Inc., Dublin, OH (US)

( * ) Notice: Subject to any disclaimer, the term of this patent is extended or adjusted under 35 U.S.C. 154(b) by 0 days.

(21) Appl. No.: 12/859,758

(22) Filed: Aug. 19, 2010

(65) Prior Publication Data

US 2011/0146198 A1  Jun. 23, 2011

Related U.S. Application Data

(60) Provisional application No. 61/235,310, filed on Aug. 19, 2009.

(51) Int. Cl.
*E04B 1/00* (2006.01)
*E04B 1/98* (2006.01)
*E04H 9/02* (2006.01)

(52) U.S. Cl. ............... 52/745.05; 52/167.1; 52/167.2; 52/167.3; 52/167.4

(58) Field of Classification Search ........... 52/745.05, 52/167.1–167.4, 506.06
See application file for complete search history.

(56) References Cited

U.S. PATENT DOCUMENTS

| | | | | |
|---|---|---|---|---|
| 4,106,243 A | * | 8/1978 | Horn | 52/16 |
| 4,635,756 A | * | 1/1987 | Sherwood et al. | 187/401 |
| 4,644,708 A | * | 2/1987 | Baudot et al. | 52/79.9 |
| 4,807,407 A | * | 2/1989 | Horn | 52/79.1 |
| 4,833,841 A | * | 5/1989 | Ellington, III | 52/79.1 |
| 5,675,194 A | * | 10/1997 | Domigan | 307/147 |
| 5,842,313 A | * | 12/1998 | Murray et al. | 52/220.6 |
| 6,112,483 A | * | 9/2000 | Murray et al. | 52/220.6 |
| 6,588,171 B2 | * | 7/2003 | Pryor et al. | 52/793.1 |
| 2002/0062611 A1 | * | 5/2002 | Pryor et al. | 52/309.6 |
| 2005/0086877 A1 | * | 4/2005 | Bloch-Fortea | 52/167.1 |
| 2007/0220815 A1 | * | 9/2007 | Kemeny | 52/167.3 |
| 2008/0072505 A1 | * | 3/2008 | Kuan et al. | 52/167.3 |
| 2008/0092731 A1 | * | 4/2008 | Hall | 89/36.04 |
| 2009/0151298 A1 | * | 6/2009 | Jazzar | 52/745.05 |
| 2010/0328852 A1 | * | 12/2010 | Johnson et al. | 361/641 |
| 2010/0328853 A1 | * | 12/2010 | Johnson et al. | 361/641 |
| 2011/0319006 A1 | * | 12/2011 | Gilder | 454/184 |

* cited by examiner

*Primary Examiner* — Mark Wendell
(74) *Attorney, Agent, or Firm* — Kathleen K. Bowen

(57) ABSTRACT

A method of installing distribution systems such as needed piping, ductwork, electrical wiring, and other systems in a new construction having a structural ceiling and floor, comprises the steps of: providing a frame module of main and cross frame members; assembling the modules on site directly below the final placement position; installing ductwork, piping, electrical wiring, and other distribution systems in the modules; fabricating and attaching upper wall portions to the modules; lifting modules with attached upper wall portions towards the structural ceiling; attaching support columns to the structural ceiling and floor; and mounting the modules onto the support columns, such that the support columns support the modules.

4 Claims, 9 Drawing Sheets

MODULAR SEISMICALLY RESTRAINED DISTRIBUTION SYSTEM AND METHOD OF INSTALLING THE SAME

CROSS REFERENCE TO RELATED APPLICATIONS

This application claims the benefit of U.S. Provisional Application No. 61/235,310, filed Aug. 19, 2009.

BACKGROUND

In new construction, especially in hospitals, it is not uncommon for hallways and other areas, to become filled with piping and ductwork to the point that there is no access. The addition of seismic restraint cables, braces or other seismic restraining devices is next to impossible. In addition there are many wall penetrations for all of the building services and because many of the rooms are closely controlled from an environmental standpoint, these penetrations must be tightly sealed. A tremendous about of time and effort goes into connecting, supporting, sealing around the penetrations and installing restraints on these systems.

Conventional practice has been to install the various distribution systems and equipment directly to the structural ceiling on site, in parallel to wall framing and sheathing. While systems that are installed first have reasonable access, by the time later systems are installed, access becomes virtually impossible. In addition, this method requires wall sheathing to be cut to fit in extremely cramped conditions. Prior art methods for dealing with this was to remotely assemble modules include all of the piping, ductwork, and various other distribution systems, as well as the upper wall portions. These modules were then brought on site, and individually suspended from the structural ceilings. Once suspended, connectors or couplings would be used to join the various distribution systems included in the modules. Components would be hard connected to these modules, and the entire module would be seismically restrained to the structural ceiling. Once the modules were in place, the walls could be completed.

There are many problems with this method. The alignment between the piping and duct from module to module can be a problem. Also supporting the frames off the structural ceiling can be a structural issue. Access to attach the frames to the structural ceiling is very difficult and access to all the piping and ducts to make the connections at each module joint is also very difficult. Further, damage to the upper wall segments during transport can be significant.

A method of construction is desired which would allow for easier installation of piping, ductwork and other internal systems, and make connection of these systems to each other easier. Further desired is a system which allows this to be done without damage to the upper wall portions.

SUMMARY

A method of installing distribution systems such as needed piping, ductwork, electrical wiring, and other systems in a new construction having a structural ceiling and floor, comprises the steps of: providing a frame module of main and cross frame members; assembling the modules on site directly below the final placement position; installing ductwork, piping, electrical wiring, and other distribution systems in the modules; fabricating and attaching upper wall portions to the modules; lifting modules with attached upper wall portions towards the structural ceiling; attaching support columns to the structural ceiling and floor; and mounting the modules onto the support columns, such that the support columns support the modules.

DETAILED DESCRIPTION

Figure 1:
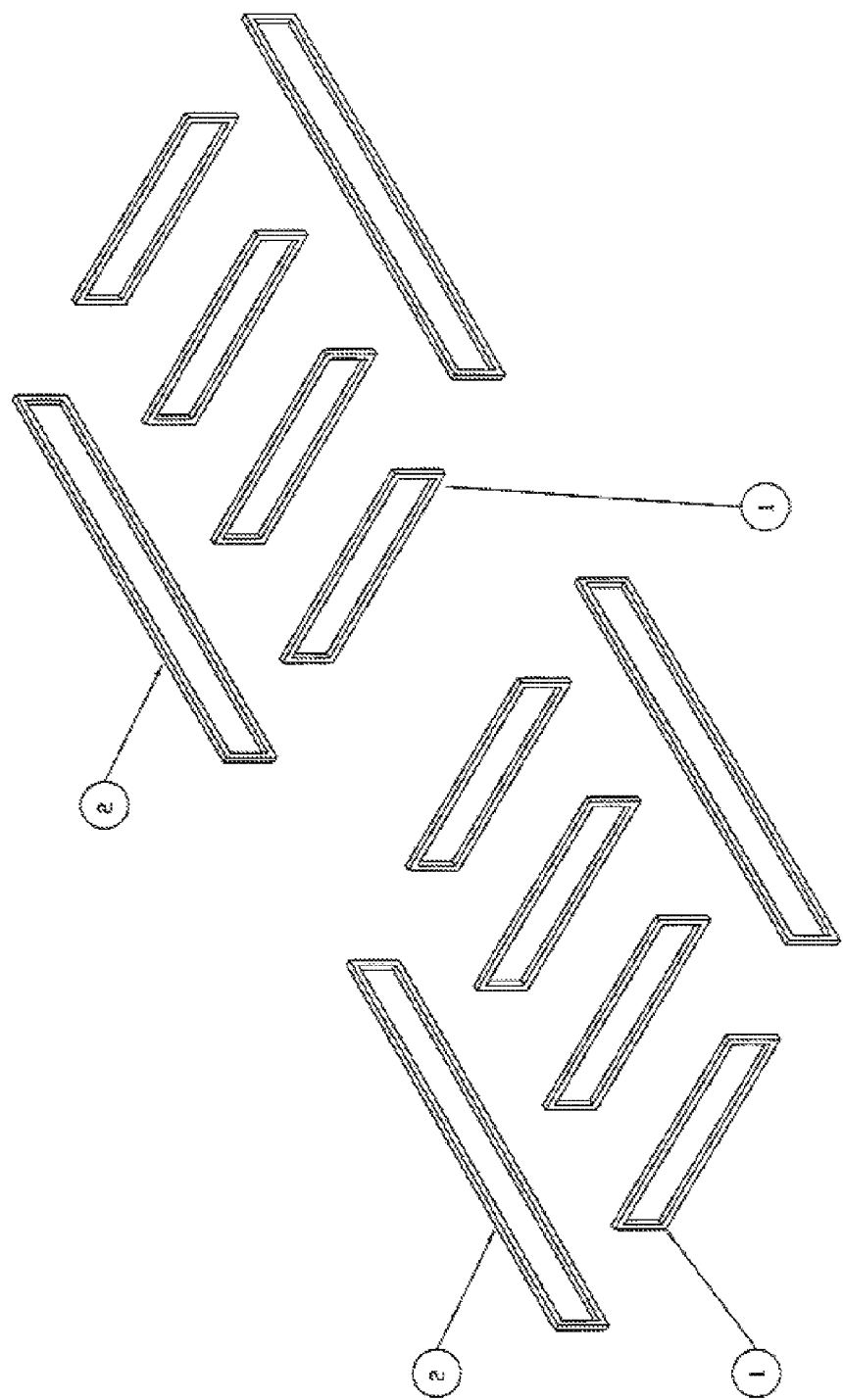
FIG. 1 is an isometric view of frame members according to an aspect of the invention.
Figure 2:
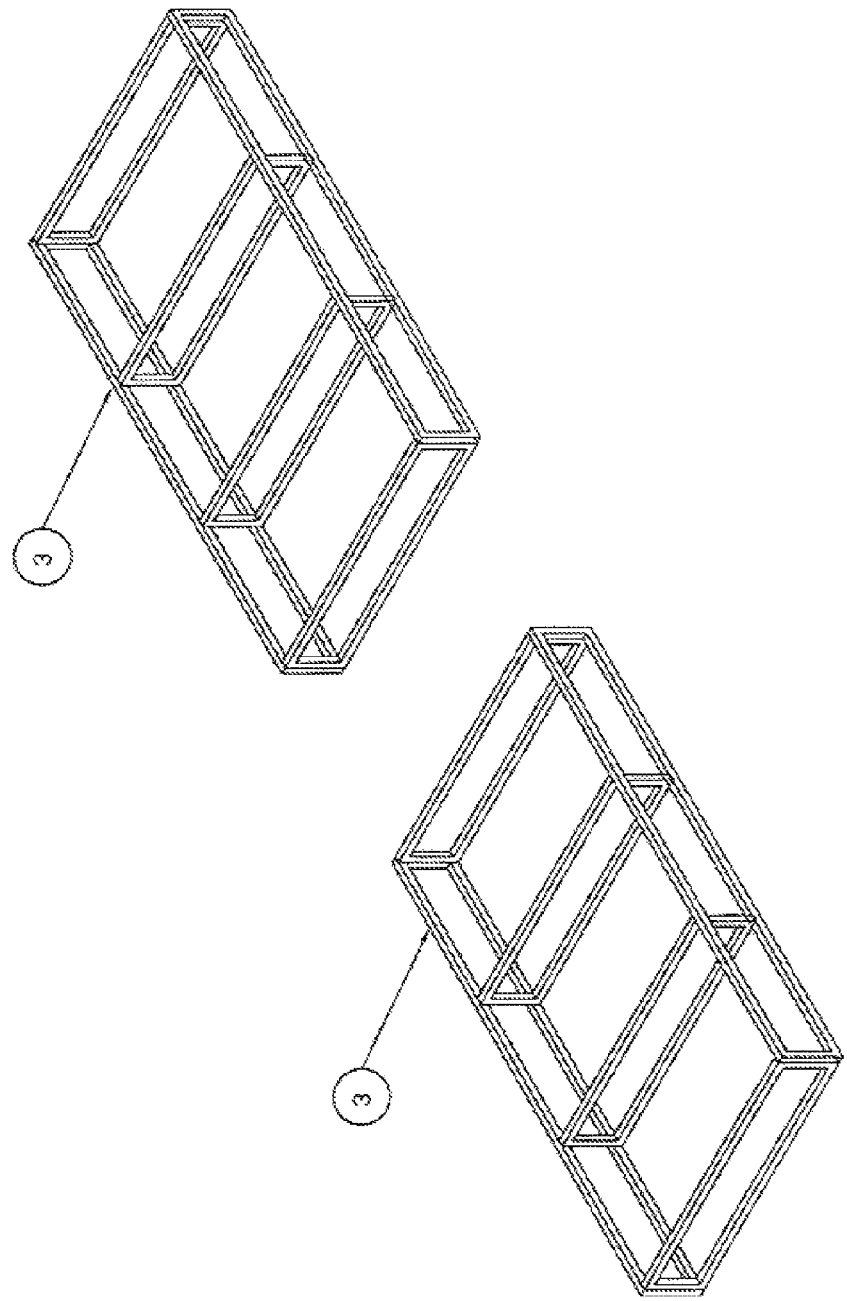
FIG. 2 is an isometric view of frame modules according to an aspect of the invention.
Figure 3:
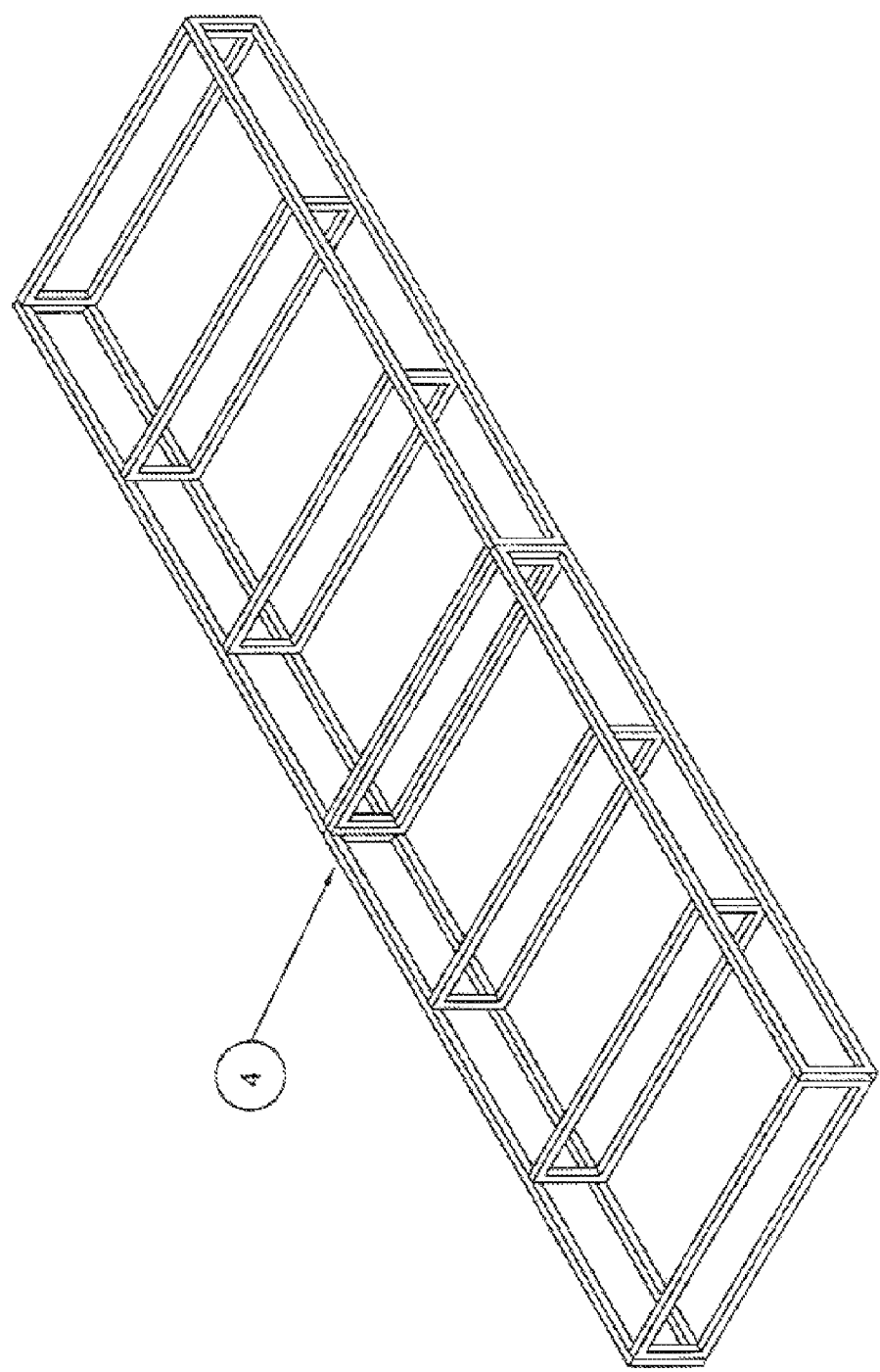
FIG. 3 is an isometric view of multiple frame modules combined according to an aspect of the invention.
Figure 4:
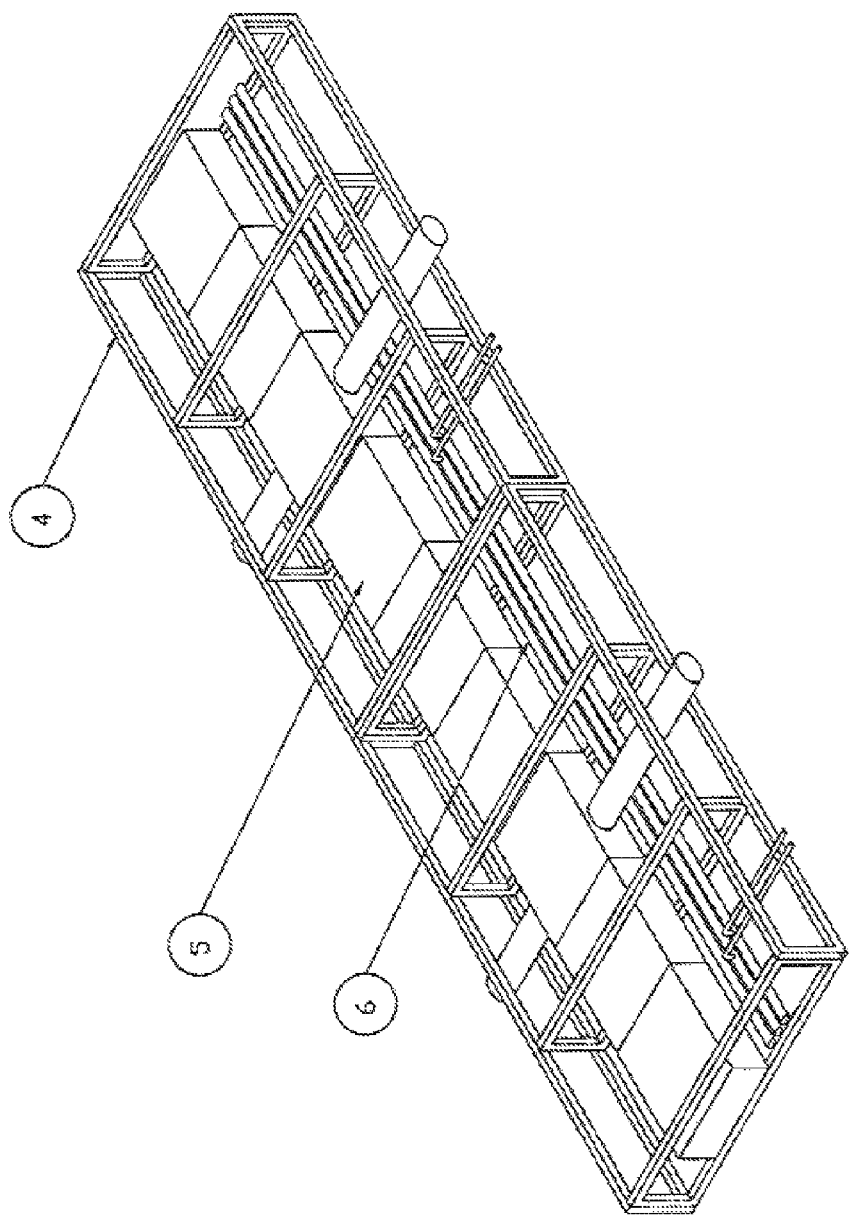
FIG. 4 is an isometric view of frame modules with installed distribution systems according to an aspect of the invention.
Figure 5:
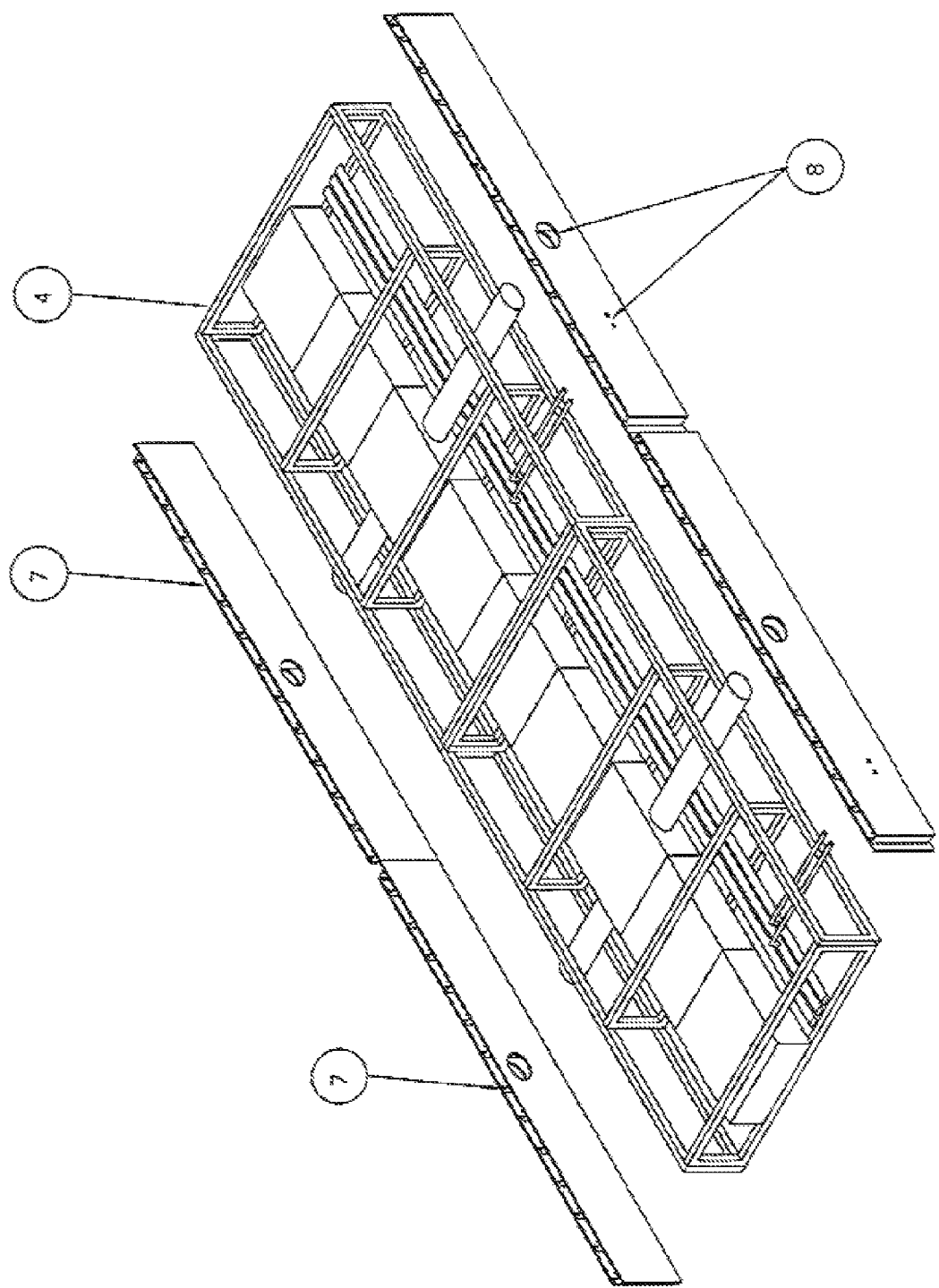
FIG. 5 is an isometric view of frame modules with installed distribution systems showing upper wall portions according to an aspect of the invention
Figure 6:
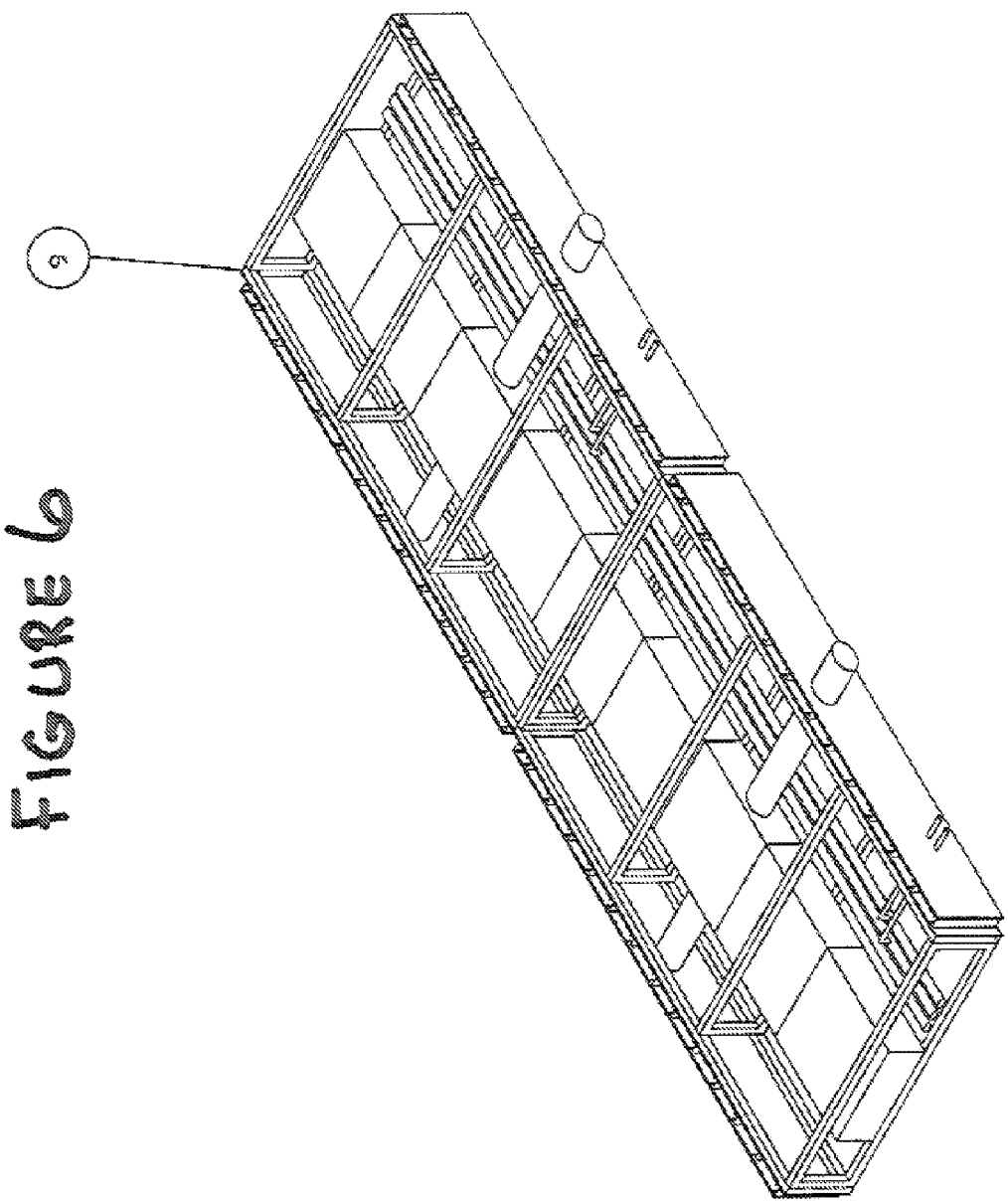
FIG. 6 is an isometric view of frame modules with installed distribution systems showing installed upper wall portions according to an aspect of the invention.
Figure 7:
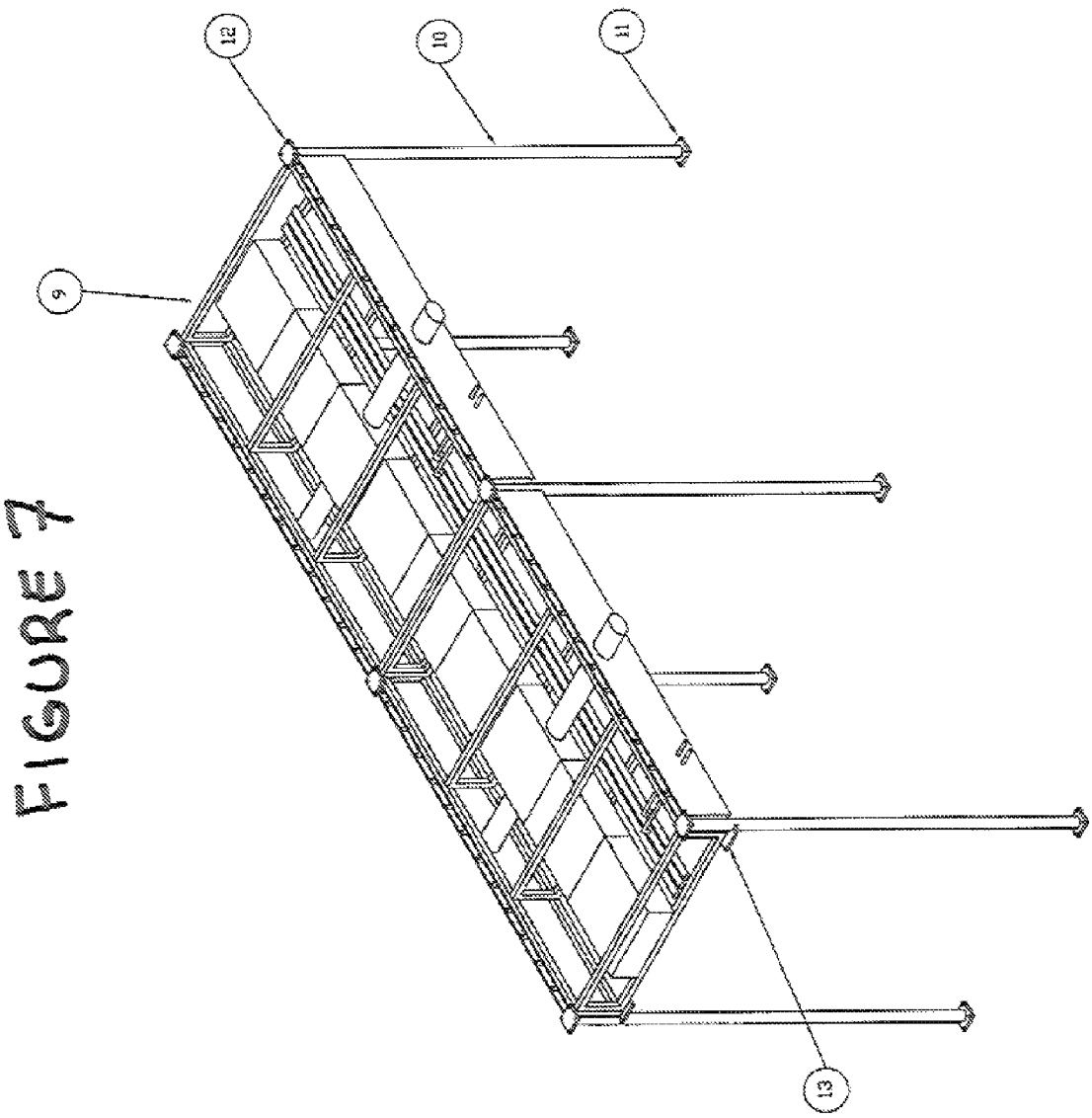
FIG. 7 is an isometric view of frame modules with installed distribution systems showing installed upper wall portions and support columns according to an aspect of the invention.
Figure 8:
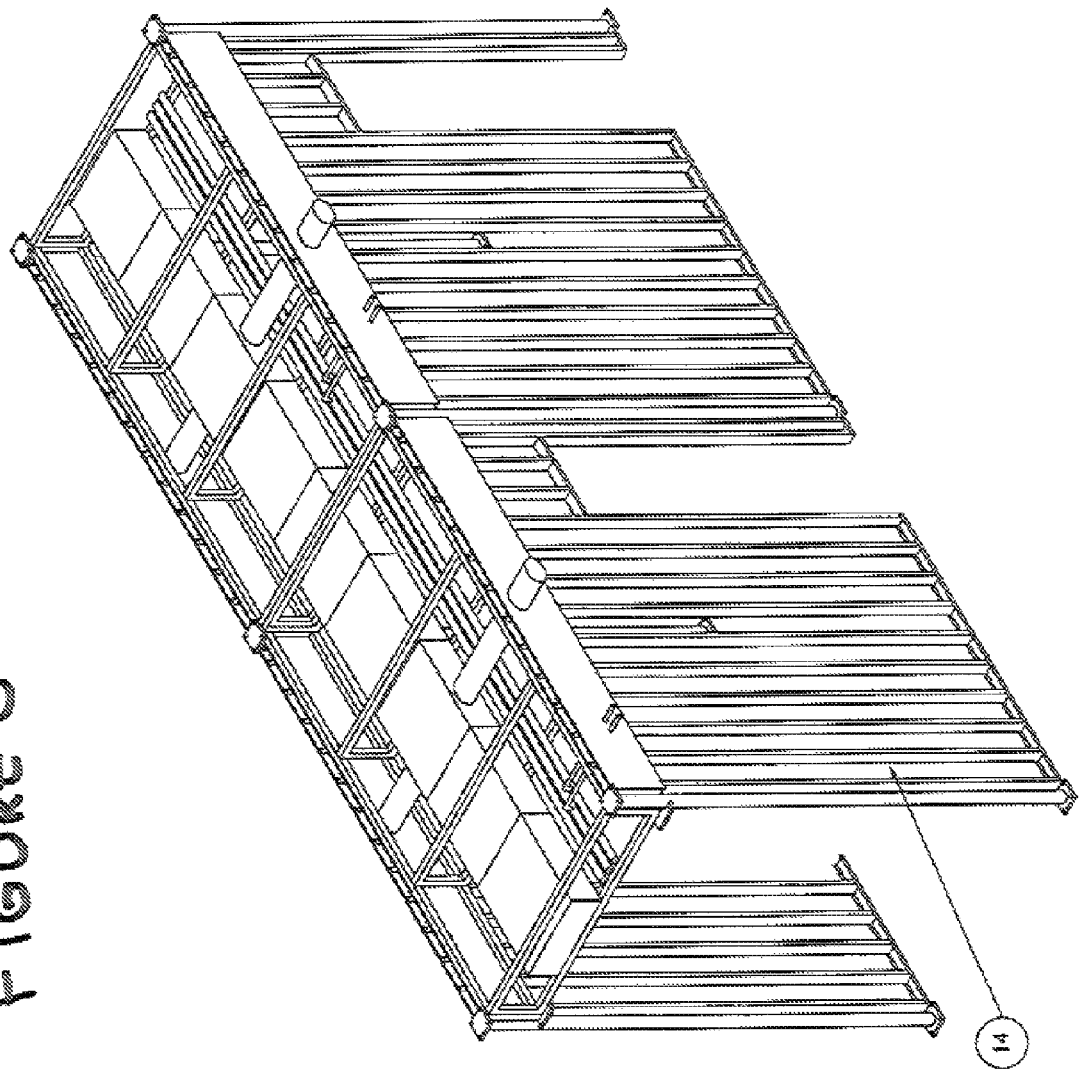
FIG. 8 is an isometric view of frame modules with installed distribution systems showing installed upper wall portions and support columns and wall framing according to an aspect of the invention.
Figure 9:
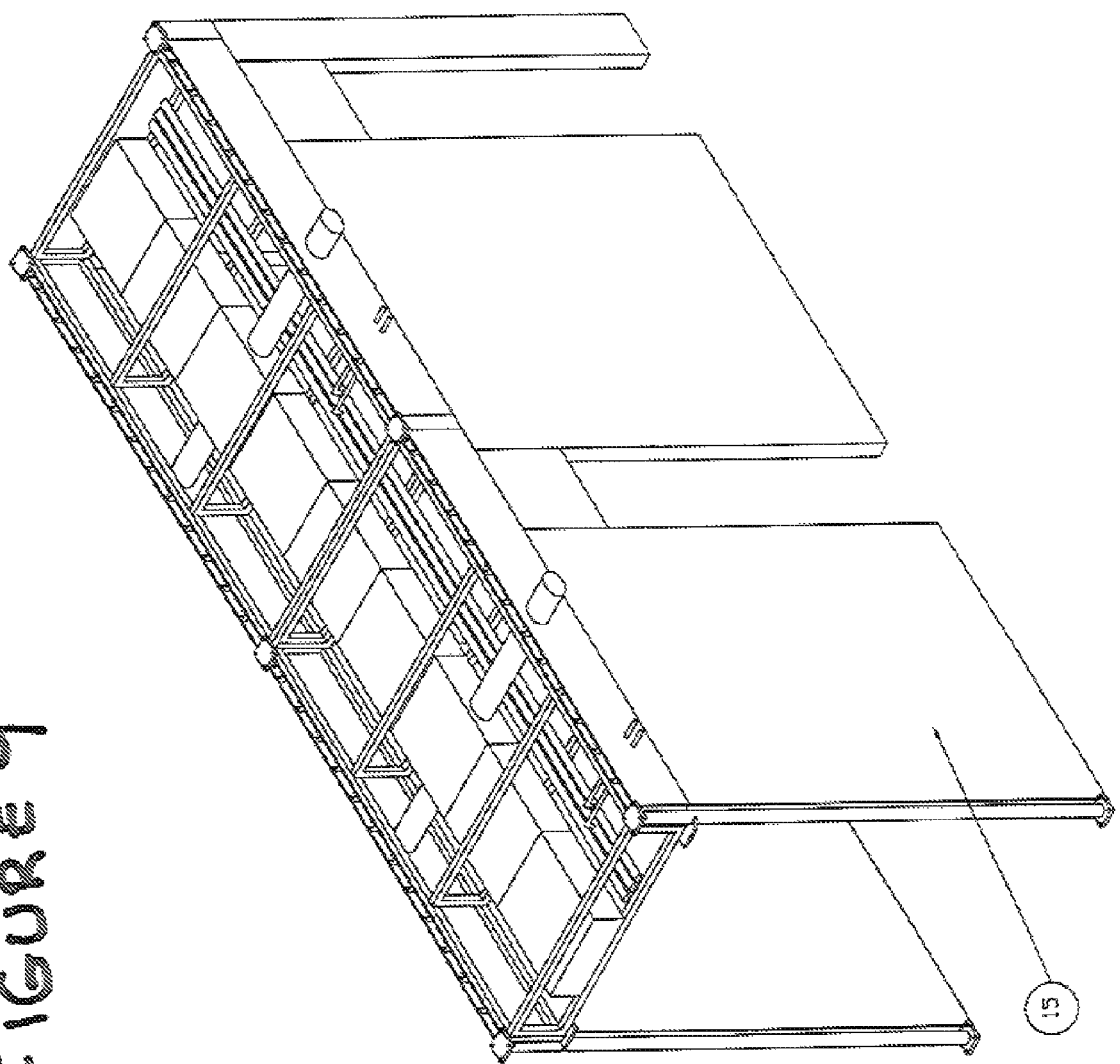
FIG. 9 is an isometric view of frame modules with installed distribution systems as installed according to an aspect of the invention.

Various aspects of the invention are presented in FIGS. 1-9 which are not drawn to scale and in which like components are numbered alike. Referring now to FIGS. 1-9, according to an aspect of the invention, a method for modular construction of seismic restraint system for new construction comprises providing a frame of main and cross frame member modules; assembling the modules at a new construction job site; installing ductwork, piping, electrical wiring, and other systems in said modules; fabricating and attaching upper wall portions; lifting modules with attached upper wall portions and attaching to structural support columns which are in turn attached to the new construction structural ceiling and floor. The frames sit on top of "knees" that are welded to the columns and the columns are attached to ceiling and floor. (Note that the capacity of the attachment hardware (particularly concrete anchors) can be significantly reduced when attaching to the underside of a roof deck. The present design helps to avoid this.)

The frame is durable, and is constructed out of bolt together main frame 2 and cross frame 1 members. These frames can be made in a variety of lengths, load bearing capacities and with different seismic ratings that could be matched to the project requirements. The main frames 2 and cross frames 1 are then transported to the job site and assembled on sawhorses or similar immediately below their intended location to form frame modules 3. The entire construction length worth of modules 3 would be assembled to form a module system 4. The distribution systems, such as ducts 5, piping 6, electrical, fire and seismic attachment would be installed into the frame modules 3 on the ground where there is easy access to top, bottom and sides. After these components were fitted, the upper wall portions 7 would be fabricated and attached.

These frame members 1 and 2 can be produced in standard sizes, with various seismic ratings for standard construction, and can also be made to specific size and seismic requirements for specific projects.

The completed string of modules 9 would then be lifted up to the structural ceiling using either lifts from below or a series of "come-a-longs" attached to the structural ceiling down either side. Once in place, columns 10 would be installed that attach to both the floor and structural ceiling. The modules 9 are then attached to the support columns 10. According to an aspect of the invention, the columns 10 are attached to the structural ceiling by a telescoping upper attachment 12. According to a further aspect of the invention, the columns 10 are mounted to the floor by a floor bracket 11. According to an aspect of the invention, the columns 10 are provided in a range of heights, weight and seismic capacities. The attachment points for these columns would be easy to access.

Once installed the wall framing 14 between the underside of the upper wall segments 7 and the floor would be fitted and eventually closed up with gypsum board panels 15. The columns 10 would be fully concealed by the walls with the only portion that would protrude through the wall being the bracket 13 that supports the modules 3.

According to an aspect of the invention, a drop ceiling could then be easily fitted below the modules 3 to complete the hallway.

We claim:

1. A method of installing seismically restrained distribution systems, in a new construction having a structural ceiling and structural floor, comprising the following steps in the order named;

Providing a frame module of main and cross frame members;

Assembling said module on site directly below a final placement position;

Installing distribution systems in said module;

Fabricating and attaching upper wail portions to said module;

Lifting module with attached upper wall portions towards the structural ceiling;

Attaching support columns to the structural ceiling and structural floor, wherein said support columns span from the structural ceiling to the structural floor; and Mounting said module onto said support columns, such that said support columns support said module.

2. The method of claim 1 further comprising installing wall framing between an underside of said upper wall portions and the floor.

3. The method of claim 1 further comprising installing drop ceiling below said module.

4. The method of claim 1 wherein said main frame, and said cross frame are seismically rated.

\* \* \* \* \*